Oct. 29, 1968
H. A. LOZEAU
3,408,490
SAFETY LIGHTING EQUIPMENT
Filed March 1, 1966
5 Sheets—Sheet 3
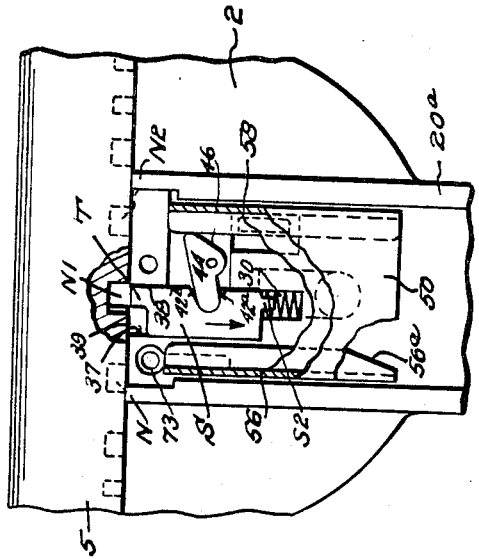
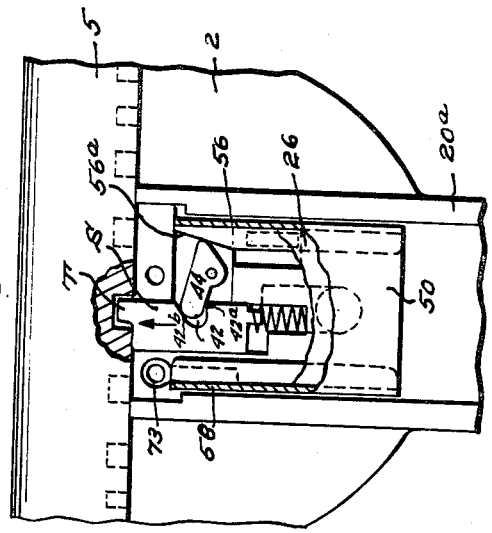
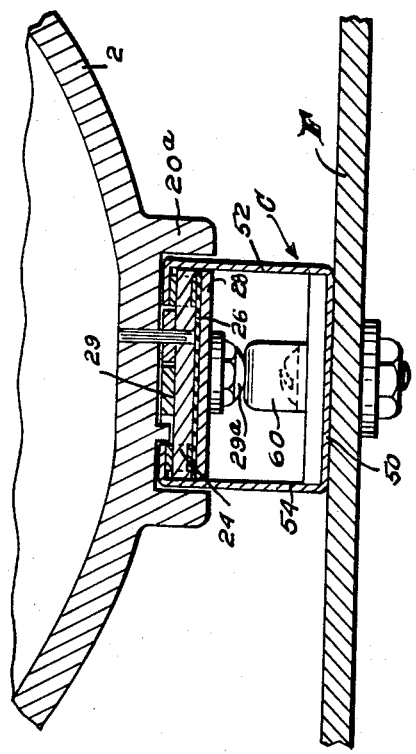
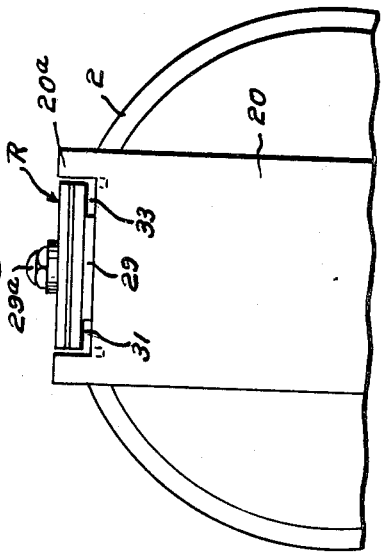
Inventor:
Homer A. Lozeau
Munro H. Hamilton
Attorney

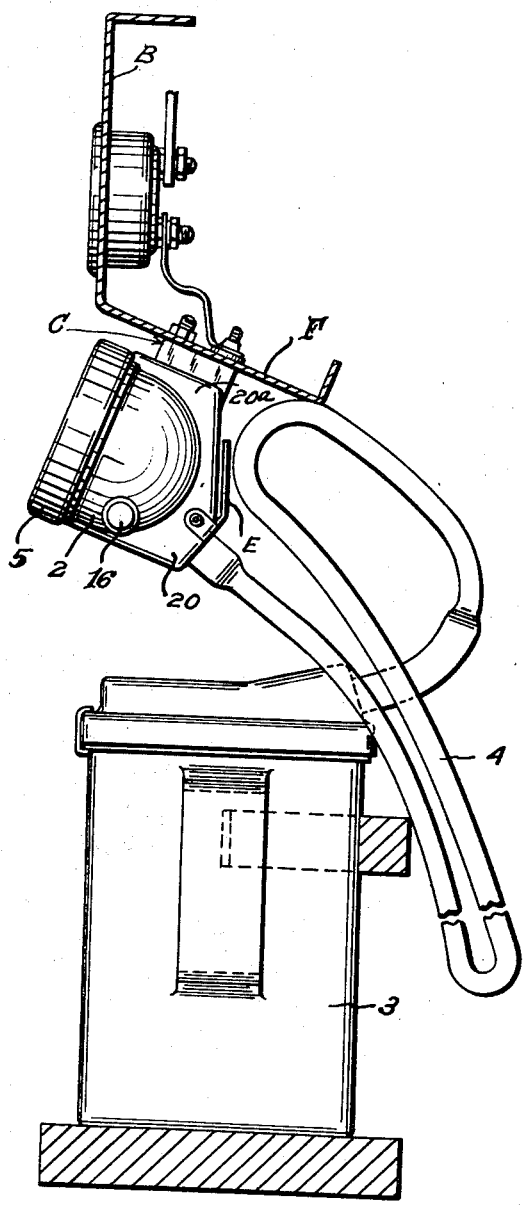

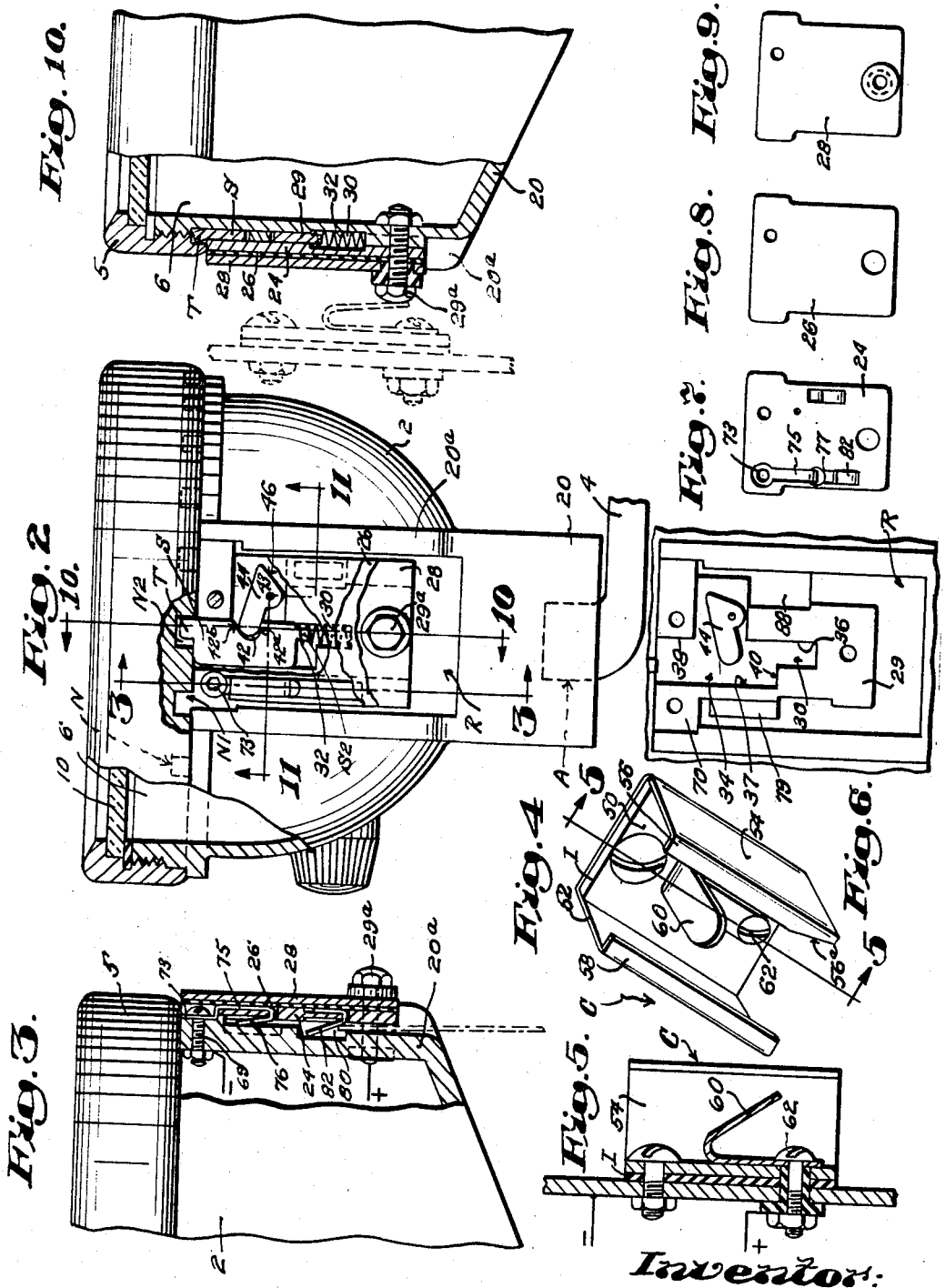

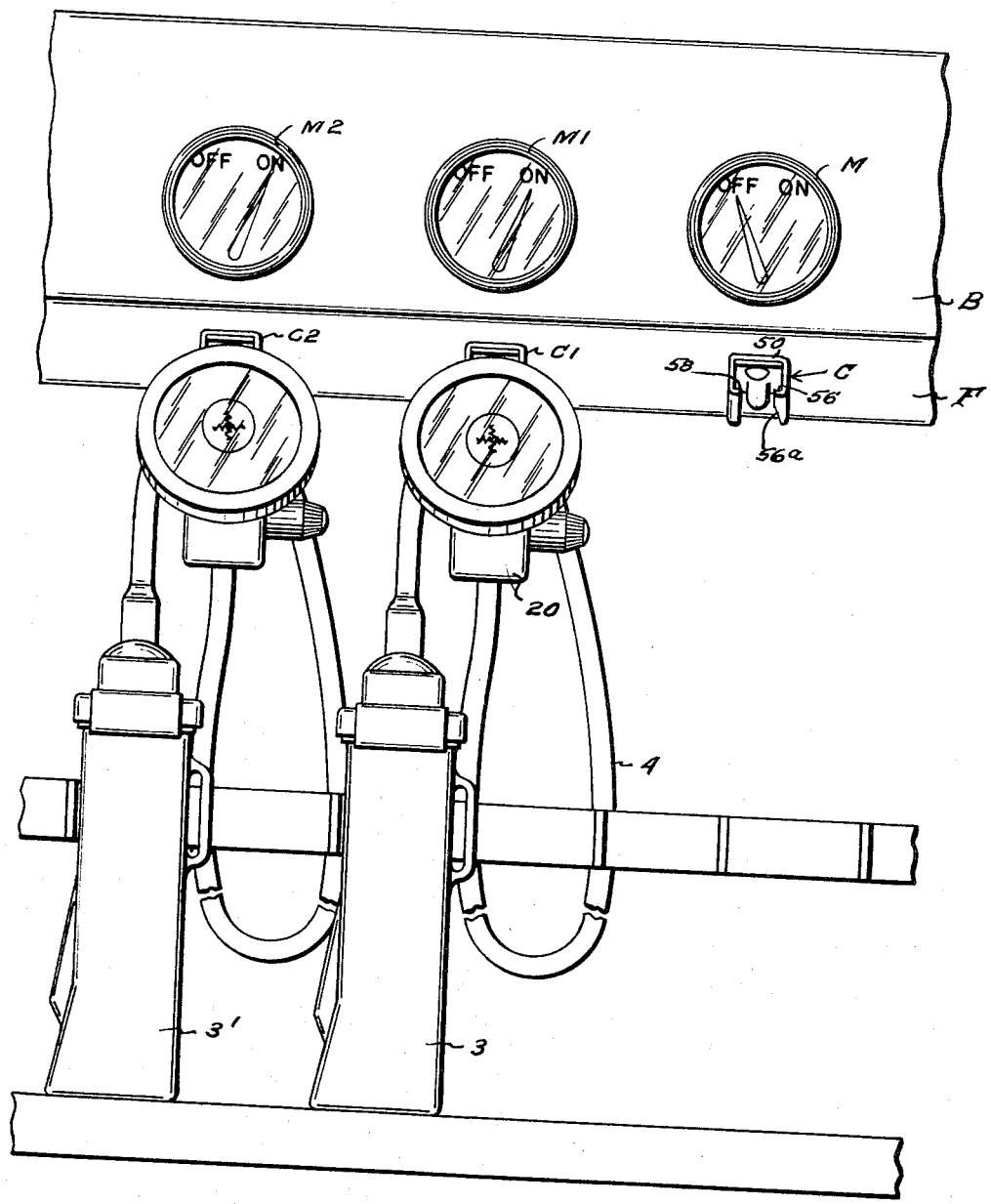

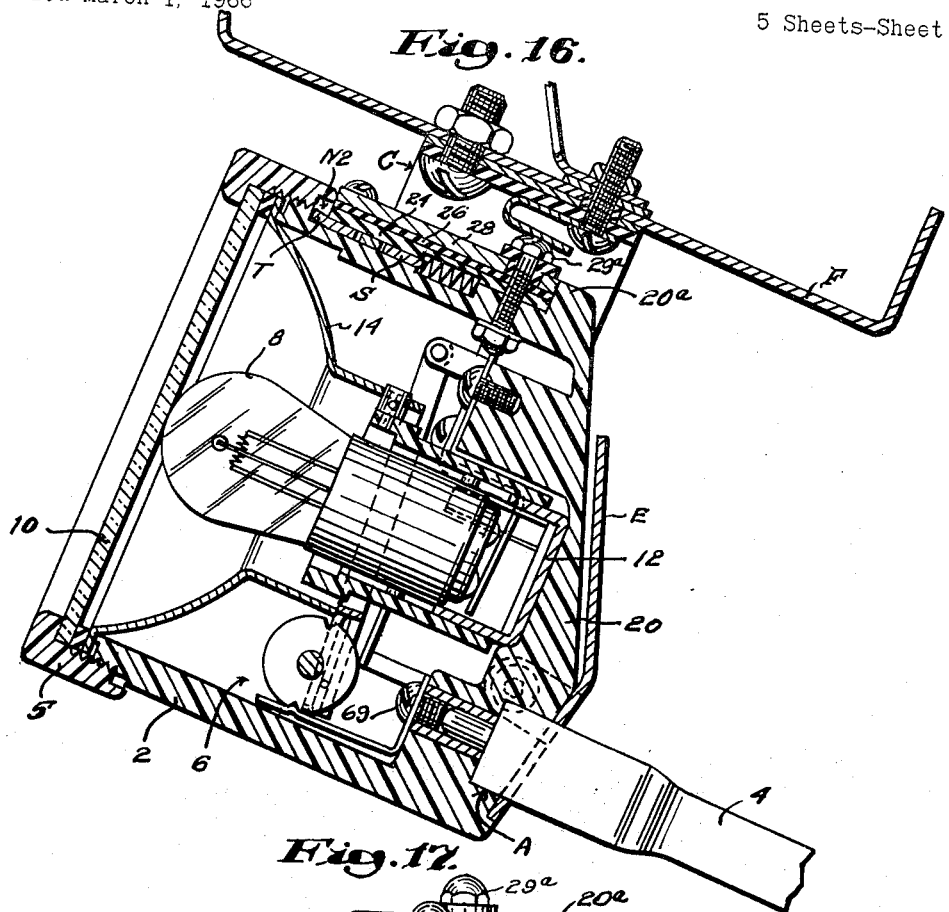

United States Patent Office 3,408,490
Patented Oct. 29, 1968

3,408,490
SAFETY LIGHTING EQUIPMENT
Homer A. Lozeau, Worcester, Mass., assignor to Koehler Manufacturing Company, Marlboro, Mass., a corporation of Massachusetts
Filed Mar. 1, 1966, Ser. No. 538,891
10 Claims. (Cl. 240—11.3)

ABSTRACT OF THE DISCLOSURE

Miner's safety lamp apparatus equipped with a novel bezel member adjustably secured about the lamp enclosure. The bezel member has an inner peripheral locking rim which is recessed at spaced apart points to form notches. The bezel member is selectively locked into place by a locking slide having an engaging tip that is moved into and out of the notches when the bezel member is in a threaded position around the lens opening. In this way, the bezel member can only be released by retracting the locking slide. Hence, tampering or dismantling of the lamp while in use is prevented.

---

This invention relates in general to portable safety lighting equipment having electrical components which are protectively confined so that they may be safely employed in explosive atmospheres and which are, in addition, selectively locked together to prevent tampering or dismantling while in use. More particularly, the invention is concerned with a miner's safety cap lamp apparatus of the class including a headpiece containing a lamp and electrical components, a storage battery carried from a miner's belt, and a flexible cord containing conductors for carrying current from the battery to the lamp in the headpiece.

In the use of miner's cap lamps of the class referred to, it is customary for the miner when leaving the mine to place the cap lamp apparatus in a battery charging rack so as to maintain the storage battery on charge when the equipment is not in use. Since it is required by law in many mining areas that all internal parts of a miner's lamp, as well as the charging terminals and other removable parts of a miner's lamp be locked against tampering while in use, the conventional form of headpiece has usually been provided with separate locking means for the lamp bezel. In addition, charging terminals are in some miner's lamps arranged internally of the headpiece and require the use of a special battery charging key mechanism located in the battery charging station. In other miner's lamps the charging terminals are secured in a hinged battery top which is mechanically located.

For further details of one typical miner's cap lamp apparatus which has been widely used for many years, reference may be had to U.S. Patent Nos. 2,312,613 and 2,312,614, which patents are owned by the assignee of the present application.

While cap lamps of the class disclosed in these patents have been satisfactory and a substantial improvement in the art, there are certain disadvantages present in connection with their daily use and maintenance. Provision of a separate locking system for the bezel necessitates the use of a special tool and is time consuming to operate, as well as not alway furnishing as complete tamper-proof protection as desired. Thus a need exists for a simplified more effective and quickly operated bezel lock.

Similarly, the key operated battery charging terminal arrangement described above requires a headpiece construction which must be made larger to house all of the internal locking elements. Increasing the size of the headpiece creates a further disadvantage. This is due to the fact that in utilizing a battery charging key mechanism the headpiece has to be rotated by hand about the key which is held in a fixed position in the battery charging rack. As a result where a row of headpieces are to be placed on charge, additional space must be provided in the battery charging rack in order for the rotative movement of the lamp and cord to be freely carried out. This imposes a limitation on the number of lamps which can be handled in any given space. More importantly a time delay is necessarily experienced by each miner in placing a lamp and battery on charge as the locking mechanism must first be released. With a considerable number of miners moving into and out of a lamp house such a time delay can be a source of difficulty at the beginning or ending of a work shift.

It is, therefore, a chief object of the invention to provide improved safety lighting equipment which is compact, easy to operate and capable of being safely used in mines or other localities where explosive atmospheres are encountered.

Another object of the invention is to devise a locking mechanism which can be utilized by a miner with a substantial reduction in the time interval required to put a battery on charge in a lamp house.

Another object of the invention is to devise a single locking system for both bezel and charging contacts so that the use of a separate tool for the bezel lock may be eliminated and the two locking operations may be combined in one compact assembly of parts.

With these objects in mind, I have provided an improved safety lighting apparatus which is based on the concept of combining a dual locking system for bezel and charging contacts in cooperating relationship at some convenient point in a miner's headpiece member.

I have further devised a specially formed headpiece receptacle in which both bezel locking components and battery charging contacts are housed. In this one receptacle I provide a simplified battery charging terminal arrangement and a bezel lock arranged to receive a specially designed battery charging accessory. By means of this battery charging accessory a battery charging operation on a charge rack may be carried out independently of the bezel lock operation and yet when desired the bezel lock may be automatically released by the step of placing the battery on charge and an important reduction in the time required to place the battery on charge is realized.

An important feature of the arrangement described is the provision of a novel headpiece construction formed with a common receptacle which is arranged adjacent to the bezel of a headpiece and which contains both bezel lock means and charging contacts in such relative position that selective engagement by the charging accessory can operate either or both and yet these parts are maintained at all times in a fully protected position against tampering.

Another desirable feature of the invention is the provision of trapping spaces arranged in the common receptacle so as to provide for engagement by a special battery charging accessory while at all times preventing tampering with the lock mechanism. The trapping spaces are designed especially to prevent any tool or device other than the special battery charging accessory from being inserted in the receptacle.

Still another desirable feature of the bezel lock is that it may be tightened to any desired position and need not be adjusted to a particular position in order for the bezel lock to become properly engaged.

The nature of the invention and its other objects and novel features will be more fully understood and appreciated from the following description of a preferred embodiment of the invention selected for purposes of illustration and shown in the accompanying drawings, in which:

FIGURE 1 is a side elevational view of the safety lighting apparatus of the invention including a battery and headpiece, with the headpiece being shown mounted in charging position on a battery charging rack utilizing a charging accessory of the invention;

FIGURE 2 is an elevational view of the miner's safety lamp headpiece of the invention with a bezel locking means shown partly in elevation;

FIGURE 3 is a cross section taken on the line 3—3 of FIGURE 2;

FIGURE 4 is a detail perspective view of a special battery charging accessory member;

FIGURE 5 is a cross section taken on the line 5—5 of FIGURE 4;

FIGURE 6 is a detail elevational view of a recessed receptacle portion of the headpiece in which the locking slide is designed to be received;

FIGURES 7, 8 and 9 are detailed elevational views of locking slide cover plate components;

FIGURE 10 is a cross section taken on the line 10—10 of FIGURE 2;

FIGURE 11 is a cross sectional view taken on the line 11—11 of FIGURE 2;

FIGURE 12 is a fragmentary elevational view of the headpiece showing the locking slide in a disengaged position and also illustrating an accessory member in an operative position;

FIGURE 13 is a fragmentary detail end view of the headpiece;

FIGURE 14 is a fragmentary elevational view of the headpiece with the accessory member shown in FIGURE 12 being indicated in a reversed position;

FIGURE 15 is a fragmentary front elevational view of a battery charging rack with headpieces of the invention shown mounted thereon in a battery charging position;

FIGURE 16 is a cross sectional view of the headpiece taken centrally of the lamp chamber with the bezel and lens fully engaged; and FIGURE 17 is detail end view of the lamp supporting structure looking directly into the lamp chamber with the lens and bezel removed.

In the structure shown in the drawings, I have disclosed a preferred embodiment of the invention in the form of miner's cap lamp apparatus. It will be understood that while the invention will be described in detail with reference to a miner's cap lamp structure, this is not done in any limiting sense and both the bezel locking and battery charging features hereinafter disclosed may be applied to other forms of portable lighting equipment, either separately or in conjunction with one another.

Attention is also directed to the fact that the portable lighting apparatus of the invention is designed for use by a miner in two different ways. In one case the equipment is carried by a miner in a mine for lighting purposes. In the second case the equipment is placed by the miner on a charging rack and left there for maintaining the battery on charge or for otherwise servicing the headpiece components.

Thus the invention in its simplest aspect comprises a standard type battery and headpiece with specially designed bezel lock means and lock accessory. In another form the invention includes the battery and headpiece together with a battery charging rack and battery charging accessory mounted on the charging rack. Both adaptations of the invention are shown in the drawings.

Considering the invention in detail, FIGURE 1 denotes a typical charging rack B used to charge a battery 3. Charging racks of this form are commonly used with miner's cap lamp apparatus of the class presently manufactured and sold by the Koehler Manufacturing Company of Marlboro, Mass., a detailed description of which apparatus is set forth in U.S. Patent No. 2,947,851.

As shown in FIGURE 1 the miner's cap lamp apparatus of the invention is connected to battery 3 and supported on the rack B in an inverted position. This cap lamp apparatus is designed, when used by a miner, to be attached to the miner's cap by a clip E in the well known manner and some of the components of the cap lamp are of conventional nature as will be indicated below.

The storage battery 3 of conventional type is provided with electrical conductors enclosed in a flexible cord 4 and connected to a headpiece 2. The headpiece 2 is preferably made of molded plastic insulating material and is formed with the usual lamp chamber 6 and a circular lens opening in which is contained a lens 10. In the lamp chamber is a lamp 8, a lamp socket 12 and a reflector 14, as is more clearly shown in FIGURE 16.

The lamp 8 is preferably of the two filament type and controlled by a knob 16 which may be operated to energize either one of the filaments in the lamp as desired, as well as moving a reflector apparatus for selectively focussing a reflected beam of light from either of the filaments. This dual filament and focussing arrangement is shown in FIGURE 16 and is further described in detail in U.S. Patent No. 2,947,851 noted above.

In accordance with the invention, I provide a specially formed bezel member 5 which is adapted to be secured around a threaded part of the headpiece 2, and I also form one side of the headpiece 2 with an extension 20 which projects rearwardly as normally viewed in use on a miner's cap lamp. As shown in FIGURES 2 and 16, extension 20 is provided with a recess A in which the cord 4 is connected to terminals therein. It is customary for the cord 4 when thus attached to extend upwardly over the miner's cap and then downwardly to the battery 3 attached at a convenient point on a miner's belt.

Considering further the specially formed bezel member 5 of the invention, I construct this part with an inner peripheral locking rim which, as noted in FIGURE 2, is recessed at spaced apart points to form notches as N, N1, N2, etc. I still further provide a locking slide element S having an engaging tip T. This locking slide S may be resiliently supported on the headpiece at some convenient point in a right angularly disposed position so that the engaging tip can move into and out of any one of the notches when the bezel member 5 is in a threaded position around the lens opening and the bezel may thus be locked into place and when so locked can only be released by retracting slide S.

In one preferred arrangement for supporting the locking slide S, I construct the headpiece extension 20 with an enlarged base section 20a. This base section 20a is recessed as indicated in FIGURES 2, 3, 6 and 10 to provide a rectangularly shaped receptacle R. FIGURE 2 shows the slide S in the receptacle as viewed from an underside of the base section 20a with the engaging tip T engaged in bezel notch N2 in a locked position.

The receptacle R and the locking slide S are normally covered over by a cover plate assembly, the constituent parts of which are more clearly shown in FIGURES 7, 8 and 9 and noted by numerals 24, 26 and 28. This cover assembly is tightly fitted against a ramp portion 29 as shown in FIGURES 11, 13 and 16 being secured thereto by a screw fastening 29a. It will be observed from an inspection of FIGURE 13 that edges of the cover plate assembly project beyond the ramp portion 29 and as is clearly indicated in FIGURE 13 these edges define narrow slideways 31 and 33. It is pointed out that in the cover plate assembly 24, 26 and 28, the part 24 constitutes an insulated contact holder, the part 26 is a contact insulator, and the part 28 acts as an external cover and holding member.

In FIGURE 6, I have indicated the receptacle R as it appears with the cover plate assembly detached and the slide S removed. As will be observed from an inspection of FIGURE 6 there is provided in the ramp portion 29 a spring retaining cavity 30 in which may be held in a normally compressed state a small coiled spring 32. This spring 32 is not shown in FIGURE 6 but appears in FIGURES 2, 10, 12 and 14.

The coil spring 32 is arranged to project slightly beyond a slide cavity 34 formed in the ramp 29 and along which the slide S is adapted to be slidably received in a position such that a small projection part S2 can extend into one open end of the coil spring 32 as is most clearly shown in FIGURE 2.

The slide cavity 34 is defined on two opposite sides by guide edges 36, 37 and 38, and on two remaining sides by guide edges 39 and 40. The coil spring 32, when in place, normally urges the slide S against the guide edge 39. The slide S is recessed along one edge to provide an irregularly shaped slot 42 as will be observed from an inspection of FIGURE 2, and arranged in receptacle R to cooperate with this slot 42 is a slide actuating pivot 44 pinned at 43 beside the slide cavity 34 as may be more clearly seen in FIGURES 6, 12 and 14. One side 42a of slot 42 when engaged by the pivot 44, permits movement of the slide freely in its retracted position. The other side 42b of slot 42 if forced against the pivot 44 independently, will jam against the pivot so that movement of the slide is prevented.

The arrangement of the pivot 44 and irregularly shaped slot 42 relative to one another is such that when a turning force is exerted against a cam surface 46 on the pivot 44, the opposite extremity of the pivot will engage in the slot and move the slide S against the spring 32 thus retracting the engaging tip T from a notch as N2 in the bezel 5 as shown in FIGURE 12. This allows the bezel member to become free to be rotated. If, however, the slot side 42b is forced against the pivot in the position shown in FIGURE 14, then the pivot 44 is jammed and movement of the slide is prevented.

There is thus provided a simple easily operated protective bezel lock which can be used by a miner when carrying a lamp and headpiece in a mine with full safety and protection against tampering. It will be noted that the locking mechanism may be placed in an operative position simply by turning the bezel on the threaded lens opening until one of the notches becomes fully engaged with the slide S. Once this occurs, however, a reverse rotation of the bezel is prevented and the lock is permanently maintained until such time as the pivot member is actuated.

Another important feature of the bezel construction is that the bezel may be tightened to any desired position and yet does not need to be adjusted for the bezel lock to enter a notch. This is an advantage in assembly since a workman need not tighten the bezel to the full extent and yet can back off slightly to position a notch for engagement by the lock.

It will be appreciated therefore that the bezel can be tightened to the maximum as a means of preventing leakage. However, even if the lock is not engaged at this maximum position, any opposite rotation will lock the bezel as the first notch passes by the lock slide.

In order to exert a turning force on the pivot cam when the plate assembly 24, 26 and 28 is secured in place, I have devised a special lock activating accessory. This member may, however, perform a further useful function in carrying out a battery charging operation as hereinafter disclosed and may therefore also be referred to as a "battery charging accessory" and is generally denoted by the arrow C and is shown in detail in FIGURES 4 and 5.

As illustrated in FIGURES 4 and 5, the battery charging accessory C consists in a generally U-shaped member having a central portion 50 and two right angularly disposed side portions 52 and 54 which terminate in folded edges 56 and 58. These edges 56 and 58 are chosen of a thickness such that they may slidably engage in the slideways 31 and 33 in the receptacle R. When the edges 56 and 58 are fully advanced into the slots 31 and 33 in the position shown in FIGURE 14, the edge 58 engages against the cam surface 46 and causes the pivot 44 to rotate and move the slide S from the position shown in FIGURE 2 into the position shown in FIGURE 14. In this latter position it will be readily apparent that the bezel 5 may be unthreaded from the headpiece 2. It is pointed out that the accessory C may be utilized without any reference to battery charging when so desired.

To utilize the accessory C in connection with a battery charging operation, I further provide novel electrical contact means in the accessory end in the receptacle R for cooperating with the accessory C and establishing a charging circuit through the headpiece and cord to the battery. FIGURES 1, 15, 16 and 17 show the headpiece in an inverted position assumed when a charging operation is being carried out.

As will be observed from an inspection of FIGURE 17, the lamp chamber has mounted therein an arcuate contact member 66, one end of which is received on a boss 68 in the inner headpiece wall. Through this boss 68 is formed an opening which communicates with a similar opening in arcuate contact 66 and also extends into the receptacle R to receive a threaded connecting member 69 as may be more clearly seen in FIGURES 3 and 16.

Formed in the receptacle R is a terminal block 70 having an opening 72 for also receiving the threaded connecting member 69. Arranged to register with the opening 72 is provided an electrical conductor part 73 which is recessed into one side of the cover assembly element 24 as better shown in FIGURES 3 and 7 and which is also adapted to have received therethrough the threaded connecting member 69.

The electrical conductor 73 is further formed with a spring extension 75 having a bent-over end 76 which is located through an opening 77 in the cover plate element 24 and which is adapted to lie in contact with a trapping block 79 provided in the receptacle R in the manner shown in FIGURE 6. It will also be observed that the charging accessory functions as a negative charging contact as suggested in FIGURES 3 and 5.

Thus it will be observed that when the cover plate assembly is in a fully secured position, as shown in FIGURE 3, and the negative contact or edge 56 of battery charging accessory C is passed through the slideway 31, an electrical contact will be made between this member and headpiece contact 73. At the same time contact 60 connects with positive contact 29a on the headpiece, thus completing a charging circuit to the battery charging apparatus.

It is also recognized that for certain uses of the charging accessory it may be desirable to provide for the charging operation being carried out without the bezel lock being released. With this requirement in mind, I have further formed the accessory C with the beveled edge 56a as shown in FIGURE 4 and also in FIGURES 12 and 14. By means of this beveled edge the charging accessory may be attached to the headpiece in a reversed position as particularly shown in FIGURE 14 with the result that the pivot 44 will not be actuated and yet a battery charging circuit through all of the contacts noted above will be completed.

A further highly important feature of the combined lock and battery charging apparatus is realized from the greatly simplified operability and handling characteristics which are accomplished with the unique arrangement of accessory and charging contacts described. These advantages may be more fully appreciated from an inspection of FIGURE 15. As noted therein the charging rack B may be provided with a shelf or apron F preferably extending angularly inwardly as shown in both FIGURES 1 and 15. On this shelf or apron F may be located by suitable fastening means a plurality of accessory members as C, C1, C2, etc., occurring immediately below metering dials M, M1, M2 in the rack B.

The spacing between these accessory members C, C1, C2, etc. may be maintained much less than the spacing required for conventional forms of bezel locking mechanisms heretofore utilized on battery charging racks of this nature. It is pointed out that this is due to the fact that no rotative movement of the headpiece is required with the charging accessory member of the invention. Quite the opposite is the case with conventional charging rack and lock arrangements where the headpiece has to be engaged with the locking key and then rotated through a substantial arc of rotation, thus requiring additional space through which the headpiece may be moved.

It will be apparent that with applicant's headpiece and charging accessory arrangement, a simple forward sliding movement of the headpiece over the accessory edges is all that is required to attach the headpiece in a charging position, and since no rotative movement is involved, a substantially larger number of headpieces can be mounted in a given size of charging rack.

For example, in a typical charging rack a six foot length of shelf and charging panel is required for seventeen evenly spaced headpieces. In comparison a similar shelf for the headpiece of the invention could accommodate as many as twenty headpieces and possibly more. It will be understood that desirable economies in construction of the charging equipment may be realized and of even more importance a very desirable saving in time is realized from the simplified operation of engaging or disengaging a headpiece.

It will be noted that a tamper proof battery charging circuit means is provided in the receptacle R and can only be placed in a closed circuit position by the application of a specially formed actuating edge of the battery charging accessory C. To insure against any possible tampering with the contact surface 76, I have further devised a trapping space 80 in the receptacle R. This trapping space 80 occurs at a different level than the surface of the member 79 against which the bent-over portion 76 of the member 73 is held. By means of this trapping space, insertion of a tool as suggested in broken lines at the lower side of FIGURE 3 through the slideaway 31 is prevented through a tamper resistant spring 82 which is located through the cover plate element 24 as shown in FIGURE 7.

The spring 22 as indicated in FIGURE 3 projects into the trapping space 82 in such a way that any device or tool moving into the slideway 31 will be forced against one end of the trapping space 80 and prevented from reaching the member 73. If a similar tool or strip of material is inserted into the receptacle between the top of the cover plate and the side of the receptacle, it will be forced to come into contact with one edge of the trapping block 79 and similarly prevented from coming into contact with the member 73.

In a similar manner the pivot member 44 is protected by a trapping space 83 which occurs at a different level than the level on which the pivot 44 is supported and in the same manner a tool will be deflected against one or the other of the edges to prevent tampering.

From the above description of the invention it will be apparent that I have disclosed a novel bezel lock which can be compactly arranged in a headpiece and which is characterized by an extremely simple and rapid adjustment to carry out a locking or unlocking operation. The locking components are more nearly tamper proof than conventional locks and the bezel locking parts provide an option to the operator so that he may or may not release the bezel lock when the battery is placed in position for charging.

In addition, the bezel notch arrangement permits tightening the bezel in very small increments of tightness and desirable sealing advantages may be realized with a positive locking action always being insured. The design of the bezel lock and its cooperating accessory makes possible a reduction in headpiece size and closer spacing of a plurality of headpieces on a charging rack.

There is also combined in the invention a novel charging means which permits saving in time, space and equipment while providing selectivity in releasing or not releasing the bezel lock as noted above. The charging contacts, as well as the bezel lock are protected in a highly tamper proof manner by means of special trapping spaces arranged to prevent insertion of tools or other devices.

While I have disclosed a preferred embodiment of the invention, it should be understood that changes and modifications may be resorted to within the scope of the appended claims.

I claim:

1. Improved safety lighting apparatus including a lamp supporting body formed with a lamp chamber, a lamp socket and an electrical lamp detachably secured in the socket, means including a current source and electrical conductors for conducting current from the source to energize said lamp, a lens mounted around one side of the lamp supporting body, a bezel member adjustably secured about a threaded part of the lamp supporting body to hold the lens in position, locking means movable in the lamp supporting body for selectively engaging and locking the bezel in a fixed position to prevent tampering, lock operating accessory means for attachment to the lamp supporting body, said lock operating accessory means being adjustable from a fully advanced position in which the locking means is retracted into a fully detached position to set the locking means for engagement with the bezel member, said bezel being formed with spaced notches at an inner peripheral surface thereof, the said locking means including a locking slide resiliently contained at one side of the lamp supporting body and formed with an engaging end for selectively engaging in said notches in a position to prevent rotative movement of the bezel around the threaded part of the lamp support, and said locking slide being formed at one side with a slot and the locking means further including a pivoting latch arranged in the path of travel of the lock operating means in a position to be actuated thereby and to retract the engaging end of the locking slot out of engagement with the notched portion of the bezel.

2. A structure according to claim 1 in which the lamp supporting body is recessed to form a receptable in which the locking slide is received and the receptacle is closed by a cover plate means mounted in spaced relation to a surface of the receptacle to define spaced slideways along which the said lock operating accessory may be moved.

3. A structure defined in claim 2 in which the said receptacle is formed with trapping slots and the cover plate means is provided with spring clips to urge an inserted body against the trapping surfaces and thereby prevent tampering with the lock.

4. Improved safety lighting apparatus including a battery charging device, a headpiece formed with a lamp chamber, a lamp socket and an electrical lamp detachably secured in the socket, a battery charging accessory connected to the headpiece, a storage battery and an electrical conductor cord for conducting current from the battery to energize said lamp, a lens mounted around one side of the lamp supporting body, a bezel member adjustably secured about a threaded part of the lamp supporting body to hold the lens in position, locking means movable in the lamp supporting body for selectively engaging and locking the bezel in a fixed position and said battery charging accessory being slidably engageable with the headpiece to connect the said battery to the battery charging device and to simultaneously release the bezel locking means.

5. A structure according to claim 4 in which the battery charging accessory is formed with reversible contact edge means for selectively connecting the battery to the battery charging device without actuating the bezel lock.

6. A structure according to claim 5 in which the battery charging accessory includes a U-shaped conductive member having edges engageable in the headpiece to simultaneously close a charging circuit through the lamp body and to disengage the bezel member.

7. A structure according to claim 4 in which the headpiece is constructed with slideway means for receiving the battery charging accessory and protectively housed electrical contacts in the slideway means and said slideway means being further formed with trapping spaces to prevent tampering with said electrical contacts.

8. In combination a miner's cap lamp apparatus including a storage battery, a headpiece having a lamp mounted therein, an electrical conductor cord connecting the battery to the lamp, electrical conductor bar means for conducting current through the headpiece and cord independently of the said lamp, electrical contact means protectively housed in the said headpiece and connected to the said conductor bar means, slideway means formed in the headpiece and communicating with the contact means, a battery charging device, a battery charging accessory electrically connected to the charging device, said accessory being slidably disposed in the slideway means and in a fully advanced position being engageable with the said contact means to complete a battery charging circuit from the charging device through the headpiece and cord to the battery, and wherein said accessory consists of a channel shaped element having electrically conducting side edges and an electrically conducting contact supported in insulated relationship to the side edges along an intermediate portion of the channel shaped member.

9. In combination a miner's cap lamp and battery charging apparatus including a battery charging device, a battery charging rack, a battery charging accessory secured to the rack in fixed relation and connected to the battery charging device, said battery charging accessory presenting positive and negative contact portions, a battery, a headpiece having a lamp therein, an electrical conductor cord connecting the battery to the lamp, electrical conductors within the headpiece for conducting current through the headpiece and cord independently of said lamp, electrical contact means protectively housed at one side of the headpiece and connected to the said electrical conductors within the headpiece and means formed in the headpiece for slidably engaging the battery charging accessory to complete a charging circuit from the said charging device through the headpiece and cord to the battery, said headpiece including a bezel member and means for locking the bezel in a fixed position, and said means for locking the bezel being actuated when the headpiece is in a fully advanced position on the said battery charging accessory.

10. A structure according to claim 9 in which the slideway means is formed with trapping spaces to prevent tampering with the said electrical contact means.

References Cited

UNITED STATES PATENTS

| | | | |
|---|---|---|---|
| 2,312,614 | 3/1943 | Wheat | 240—11.3 |
| 2,375,866 | 5/1945 | Nelms et al. | 240—11.3 |
| 2,535,819 | 12/1950 | Stamper | 240—11.3 |
| 2,592,208 | 4/1952 | Stamper | 240—11.3 |
| 3,051,831 | 8/1962 | Grieger et al. | 240—11.3 |

FOREIGN PATENTS

| | | |
|---|---|---|
| 983,059 | 2/1951 | France. |

NORTON ANSHER, *Primary Examiner.*

RICHARD M. SHEER, *Assistant Examiner.*